E. H. JOHNSON.
KITCHEN UTENSIL.
APPLICATION FILED DEC. 14, 1916.
1,250,890.
Patented Dec. 18, 1917.
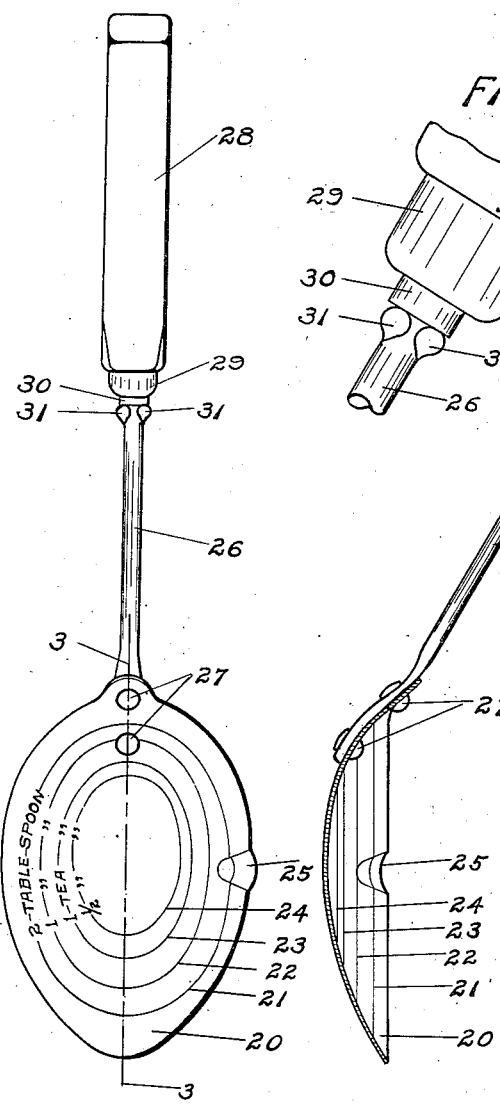
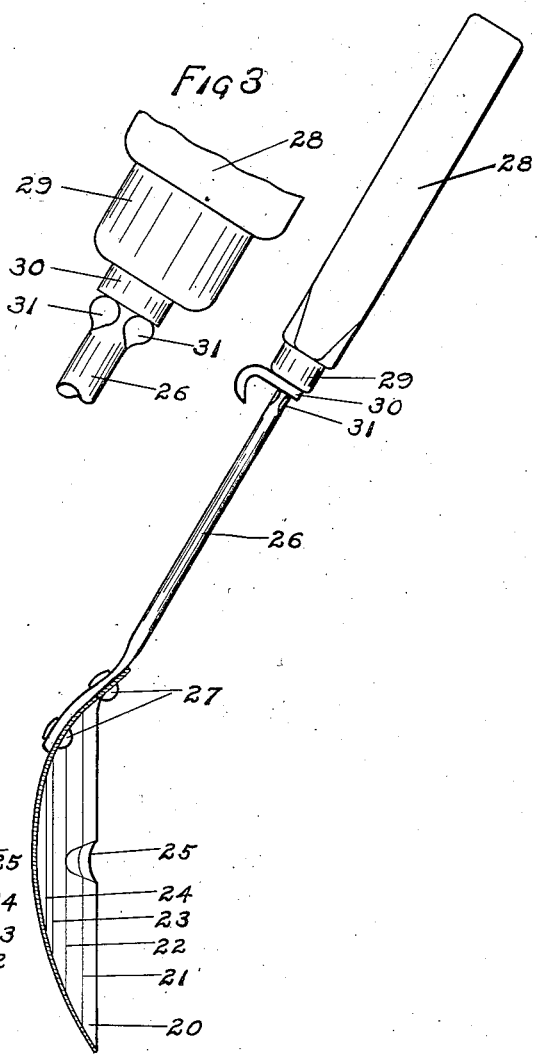
INVENTOR
Edward H. Johnson,
BY
C. E. Beach,
ATTORNEY

UNITED STATES PATENT OFFICE.

EDWARD H. JOHNSON, OF BINGHAMTON, NEW YORK.

KITCHEN UTENSIL.

1,250,890.   Specification of Letters Patent.   Patented Dec. 18, 1917.

Application filed December 14, 1916. Serial No. 136,934.

*To all whom it may concern:*

Be it known that I, EDWARD H. JOHNSON, a citizen of the United States, residing at Binghamton, in the county of Broome, and State of New York, have invented certain new and useful Improvements in Kitchen Utensils, of which the following is a specification.

This invention relates to kitchen utensils, and more particularly those used in mixing ingredients of salad dressings, gravies, pastry and similar purposes.

The objects of this invention are to produce a utensil of general utility for such uses, which may be inexpensively manufactured, and which is simple, durable, convenient in form, adapted to be readily hung up on almost any available projection when not in use so that it may be kept in a location and position where readily accessible, and which will catch on the edge of a pan or dish against which it may be rested and thus prevent it from slipping over such edge and becoming submerged in the contents of such pan or dish, and which utensil will be adapted to be conveniently employed for the removal of bottle caps, or for similar purposes.

With these objects in view, this invention consists in the details of construction shown in the accompanying drawings, hereinafter described and more particularly pointed out in the annexed claims.

Like characters of reference denote the same parts throughout the drawings, in which—

Figure 1 is a plan view of this invention,

Fig. 2 is a side elevation of Fig. 1 with the bowl shown in section along the lines 3—3 of Fig. 1, and Fig. 3 is an enlarged view of a detail to be referred to.

Referring to Figs. 1 and 2, 20 is a spoon-bowl of suitable wrought metal, having the graduating lines 21, 22, 23 and 24 stamped therein, said lines being substantially concentric and being so positioned as to indicate the levels to which said bowl will be occupied by liquid quantities respectively as follows:—2 tablespoon, 1 tablespoon, 1 teaspoon, and ½ teaspoon. Suitable lettering is stamped in said bowl as shown, indicating the capacities represented by said graduating lines as stated.

A suitable portion of the edge of the bowl 20, on the right hand side thereof as shown in Fig. 1, is bent outwardly so as to form the spout 25, which spout is of such form and so located as to be adapted to be conveniently employed, when the handle is grasped in the right hand of the user, to slowly pour liquid from said bowl so that such liquid may be measured in drops if desired.

One end of the shank 26 is fastened to the bowl 20 by means of rivets 27, 27, and the other end of said shank is driven or forced snugly into the handle 28, the end of said handle 28, where said shank enters it, being reinforced by the ferrule 29.

The wrought metal hook-shaped piece 30 is provided near one end thereof with a suitable opening through which the shank 26 passes, and is mounted upon said shank adjacent to the end of the handle 28, said piece 30 being secured in the desired position by means of the lugs or ears 31, which ears are stamped or otherwise formed in said shank 26 and are of such form and are so positioned that when said shank is placed in position in the handle 28, said ears enter somewhat into the opening in said piece 30 and also press against the side of said piece so as to hold said piece securely against the end of the handle 28 and to prevent said piece from turning.

The free end of the piece 30 projects below the shank 26 so as to be adapted to act to prevent the handle 28 from slipping over the edge of any dish or pan and becoming submerged in the contents thereof when the shank 26 is left resting against such an edge, said free end being so formed as to comprise a hook adapted to securely engage the edge of a pan so as to resist any tendency of said piece to ride over such an edge when subjected to a decided jolt or jar, the form of said hook being such that it is adapted to engage any suitable nail, peg, ledge or bar so as to support this utensil in a conspicuous and accessible position.

The space between the point of the hook and of the piece 30 is further so formed, and bears such relation to the shank 26, as to be adapted for use to remove bottle caps.

The manner of using this utensil will be obvious from the foregoing description, and it will be seen that I have devised a utensil which is simple, durable, very economical in manufacture and adapted for many uses including stirring, opening of bottles, and measuring by either spoonfuls or drops, and which will not slip into pans or dishes against the edges of which it is rested, and which is adapted to be readily hung up on such supports as are likely to be available.

Having fully described my invention, what I claim and desire to secure by Letters Patent of the United States is:

1. In a kitchen utensil,—a spoon-bowl having a round shank, a handle on the end of said shank, and a hook-shaped piece having an opening therein through which said shank passes, said shank having lugs or ears formed therein near said handle which so enter into said opening as to suitably press said piece against said handle and to maintain said piece in suitable relation to said spoon-bowl.

2. In a spoon having a round shank and a handle thereon,—suitable lugs or ears formed in said shank near said handle, and a piece formed as shown and having an opening therein for said shank, said piece being so mounted on said shank between said lugs and said handle as to be suitably engaged by said lugs.

In witness whereof, I hereunto subscribe my name, this 12th day of Dec. A. D., 1916.

EDW. H. JOHNSON.